(12) United States Patent
Piotrowski et al.

(10) Patent No.: US 8,919,160 B2
(45) Date of Patent: Dec. 30, 2014

(54) METHOD FOR PROFILING A FLAT REVERSIBLE KEY, AND FLAT REVERSIBLE KEY, BASED ON A FLAT REVERSIBLE KEY PROFILE, WHICH IS PRODUCED ACCORDING TO THE METHOD

(75) Inventors: Theo Piotrowski, Kerpen (DE); Michael Reine, Essen (DE); Thomas Wallberg, Wülfrath (DE)

(73) Assignee: C. Ed. Schulte Gesellschaft mit beschränkter Haftung Zylinderschlossfabrik, Velbert (DE)

( * ) Notice: Subject to any disclaimer, the term of this patent is extended or adjusted under 35 U.S.C. 154(b) by 538 days.

(21) Appl. No.: 13/118,848

(22) Filed: May 31, 2011

(65) Prior Publication Data
US 2011/0289990 A1 Dec. 1, 2011

(30) Foreign Application Priority Data

May 31, 2010 (DE) .......................... 10 2010 017 165

(51) Int. Cl.
*E05B 19/04* (2006.01)
*B23C 3/35* (2006.01)
*E05B 19/00* (2006.01)

(52) U.S. Cl.
CPC .............. *B23C 3/35* (2013.01); *E05B 19/0029* (2013.01)
USPC ................... 70/405; 70/406; 70/407; 70/409; 76/110; 409/81; 409/83; 407/30; 407/56; 407/61

(58) Field of Classification Search
USPC ........... 70/405–407, 409; 76/110; 409/81, 83; 407/30, 56, 61
See application file for complete search history.

(56) References Cited

U.S. PATENT DOCUMENTS

| | | | | | |
|---|---|---|---|---|---|
| 3,707,863 | A | * | 1/1973 | Schwab et al. | 70/492 |
| 3,796,130 | A | * | 3/1974 | Gartner | 409/83 |
| 5,174,141 | A | * | 12/1992 | Ohyabu | 70/492 |
| 5,438,857 | A | * | 8/1995 | Kleinhaeny | 70/493 |
| 5,443,339 | A | * | 8/1995 | Heredia et al. | 409/81 |
| 5,490,405 | A | * | 2/1996 | Ramo et al. | 70/366 |
| 5,493,884 | A | * | 2/1996 | Hinz et al. | 70/407 |

(Continued)

FOREIGN PATENT DOCUMENTS

| | | |
|---|---|---|
| DE | 3314511 | 10/1984 |
| DE | 3542008 | 6/1987 |

(Continued)

*Primary Examiner* — Peter M Cuomo
*Assistant Examiner* — Ifeolu Adeboyejo
(74) *Attorney, Agent, or Firm* — Lucas & Mercanti, LLP; Klaus P. Stoffel (57) ABSTRACT

A method for profiling broad sides of a flat reversible key. A key blank is clamped to expose the first broad side of the key blank and complementary grooves and ribs are milled using a milling cutter with cutter teeth by advance in the longitudinal direction of the key relative to the longitudinal section profile of the cutter teeth. The key blank is then clamped in a position turned by 180° about the longitudinal center axis of the key so that the second broad side of the blank is exposed, and complementary grooves and ribs are milled into the broad side with milling cutter, by advance in the longitudinal direction of the key. The cutter shaft axes is inclined at an angle of inclination (φ) relative to the longitudinal center plane of the key, at least one cutter tooth rib of the cutter teeth producing an undercut guide wall.

9 Claims, 6 Drawing Sheets

(56) References Cited

U.S. PATENT DOCUMENTS

| | | | |
|---|---|---|---|
| 5,607,267 A * | 3/1997 | Heredia et al. | 409/81 |
| 5,908,273 A * | 6/1999 | Titus et al. | 409/81 |
| 5,964,112 A * | 10/1999 | Stefanescu | 70/493 |
| 6,065,911 A * | 5/2000 | Almblad et al. | 409/83 |
| 6,101,855 A * | 8/2000 | Dimig et al. | 70/406 |
| 6,152,662 A * | 11/2000 | Titus et al. | 409/132 |
| 6,406,227 B1 * | 6/2002 | Titus et al. | 409/81 |
| 7,370,502 B2 * | 5/2008 | Widen | 70/493 |
| 2003/0015008 A1 * | 1/2003 | Lou | 70/493 |
| 2004/0253067 A1 * | 12/2004 | Bosch | 409/132 |
| 2006/0207303 A1 * | 9/2006 | Almagor et al. | 70/493 |
| 2007/0028658 A1 * | 2/2007 | Widen | 70/493 |
| 2011/0056258 A1 * | 3/2011 | Widen | 70/406 |

FOREIGN PATENT DOCUMENTS

| | | |
|---|---|---|
| DE | 69421093 | 1/2000 |
| DE | 10049662 | 11/2002 |
| DE | 102005036113 | 3/2006 |
| DE | 102007057407 | 5/2009 |

\* cited by examiner

```
┌─────────────────────────────────────┐
│ clamping a key blank in a clamping  │
│ device so that a first broad side   │
│ of the key blank is exposed         │
└─────────────────────────────────────┘
                  │
┌─────────────────────────────────────┐
│ inclining the axis of a cutter      │
│ shaft of a milling cutter at an     │
│ angle of inclination relative to a  │
│ longitudinal center plane of the    │
│ key                                 │
└─────────────────────────────────────┘
                  │
┌─────────────────────────────────────┐
│ milling complementary grooves and   │
│ ribs in a first broad side of the   │
│ key by the milling cutter in a      │
│ longitudinal direction              │
└─────────────────────────────────────┘
                  │
┌─────────────────────────────────────┐
│ turning the key by 180° about the   │
│ longitudinal center axis            │
└─────────────────────────────────────┘
                  │
┌─────────────────────────────────────┐
│ milling complementary grooves and   │
│ ribs in a second broad side of the  │
│ key using the same milling cutter   │
│ and the same angle of inclination   │
└─────────────────────────────────────┘
```

METHOD FOR PROFILING A FLAT REVERSIBLE KEY, AND FLAT REVERSIBLE KEY, BASED ON A FLAT REVERSIBLE KEY PROFILE, WHICH IS PRODUCED ACCORDING TO THE METHOD

CROSS-REFERENCE TO RELATED APPLICATIONS

The present application claims priority of DE 10 2010 017 165.4-14, filed May 31, 2010, the priority of this application is hereby claimed and this application is incorporated herein by reference.

BACKGROUND OF THE INVENTION

The invention relates to a method for profiling the broad sides of a flat reversible key, a key blank being clamped in a clamping device in such a way that the first broad side of the key blank is exposed, complementary grooves and ribs being milled using a milling cutter that has cutter teeth on its peripheral surface and rotates about a cutter shaft, by advance in the longitudinal direction of the key with respect to the longitudinal section profile of the cutter teeth, and the key blank then being clamped in a position which is turned by 180° about the longitudinal axis of the key in such a way that the second broad side of the key blank is exposed, and complementary grooves and ribs being milled into the broad side, using the same milling cutter, by advance in the longitudinal direction of the key with respect to the longitudinal section profile of the cutter teeth.

The invention further relates to a flat reversible key profile for a flat reversible key to be produced according to the method, the key having a key bit which has a first broad side and a second broad side situated opposite therefrom, the two broad sides forming grooves and ribs which extend symmetrically, in the cross-section, about a single point, relative to a longitudinal central axis of the key.

The invention further relates to a flat reversible key which has been produced corresponding to the profile variation specification according to the invention, and which is part of a locking system.

Flat keys produced according to such a method have an elongate key shank whose broad sides are profiled with alternating grooves and ribs. The ribs and grooves extend in the direction of the longitudinal extent of the key shank. At one end, the key shank has a key tip via which the key may be inserted into a profiled key channel, which is substantially complementary to the key profile, of a lock cylinder. The key shank originates from a key bow at the end opposite from the key tip. Such flat keys have two narrow sides and two broad sides. In the cross-section through the key shank, the broad sides are configured symmetrically about a single point relative to a longitudinal centerline, so that the flat reversible key may be inserted in two reversed positions into a key channel of a lock cylinder. Each of the two broad sides is thus identically profiled with grooves and ribs which extend parallel to the centerline of the key. The key channel forms complementary grooves and ribs, so that in this region grooves and ribs of the key and of the walls of the key channel interengage in a guiding manner. The portion of the key shank having the indentations is likewise provided with ribs and grooves which may have different rib heights and groove depths in order to individualize keys or locking systems. Locking hierarchies are developed by adding or removing grooves or ribs.

A generic method for producing a key of this kind is disclosed in DE 10 2007 057 407 A1. As described therein, the key blank is clamped between two clamping jaws so that one of the two broad sides is exposed. The broad sides are profiled using a milling cutter having cutter teeth on its peripheral surface which have a profile that is complementary to the profiled grooves and profiled ribs of the key shank being produced. The key is advanced in the direction of extent of the shank. The axes of the milling cutters which are rotationally driven by an electric motor extend parallel to the plane of the broad side of the key. This means that these axes extend perpendicularly to the surface normals of the plane of the broad side.

A similar device which may be used to carry out the generic method is disclosed in DE 100 49 662 C2. Here as well, grooves and ribs are milled parallel to the direction of extent of the key, using a milling cutter which is rotationally driven about a rotational axis that extends parallel to the plane of the broad side of the key. This method may be used to mill only grooves or ribs whose groove walls or rib walls, respectively, define a positive angle relative to the key normals. The flank angles of the cutter tooth ribs are greater than 90°. Therefore, the flank angles of the grooves are also greater than 90°. The magnitude of the clearance angle relative to the vertical is usually 3° in order to avoid harmful friction of the cutter teeth against the groove walls.

DE 694 21 093 T2 describes the production of undercut profiled grooves on a key blank, using cutting discs which are driven about rotational axes that are inclined with respect to the plane of the broad side of the key.

It is known from DE 35 42 008 to produce undercut grooves by applying a disc to the broad side of a key.

DE 33 14 511 A1 describes a flat key, wherein grooves having an undercut groove wall are cut on each of two oppositely situated broad sides.

A key profile is likewise known from DE 10 2005 036 113 A1, wherein groove walls of the profiled grooves are undercut. Here as well, the undercut grooves must be milled in a separate work operation, using inclined cutting discs.

SUMMARY OF THE INVENTION

It is an object of the invention to provide a method for producing key profiles having at least one undercut groove wall, wherein each broad side may be profiled in a single work operation.

It is first and primarily provided that the axis of the cutter shaft is inclined at an angle of inclination relative to the longitudinal center plane of the key. This angle of inclination defines the maximum possible undercut angle of the at least one undercut groove. The ribs or grooves of the cutter teeth originate from an at least virtual frustoconical lateral surface having a cone angle which corresponds to the angle of inclination. This frustoconical lateral surface is situated in the region of the cutter tooth engagement, parallel to the longitudinal center plane, i.e., the plane of the broad side of the key blank. At least one groove flank of one of the cutter teeth has a flank angle relative to the rotational axis of the milling cutter which is small enough for this cutter tooth flank to produce an undercut groove wall. In the method according to the invention, the unprofiled key is first clamped between two clamping jaws, so that one of the two mutually parallel broad sides of the key blank is exposed. The other broad side of the key blank is supported on a support surface situated between the two clamping jaws. The clamping jaws preferably engage on the two oppositely situated longitudinal narrow sides of the key shank, i.e., at the front and the back of the blank. The rotational axis of the milling cutter with which the first broad side of the key blank is profiled extends at an angle relative to the broad side of the key. The cutter ribs of the cutter teeth project from the peripheral surface of the cutter head which extends substantially on a conical lateral surface. The cutter teeth are brought into engagement with the broad side of the key blank to be machined by advancing the cutter head transverse to the milling cutter axis. Either the cutter head or the key blank is then advanced in the direction of the longitudinal axis of the key, so that a broad side surface of the key blank is machined in one work operation. After this first machining step, the key is removed from the clamping device with the aid of a gripper arm, for example, and is placed in the same clamping device or a second clamping device, in which the already profiled broad side surface of the key shank now faces the support surface of the clamping device, so that the second broad side of the key which has not yet been profiled is exposed. This second broad side of the key is then similarly milled using the same cutter head. The cutter shaft of the milling cutter is inclined by the same angle relative to the plane of the broad side of the blank. Coding recesses which represent the lock code of the key are then introduced into the broad side of the key, it being possible for these drill cavities to extend in a row over the entire region of the key shank. At least one of the grooves preferably has an undercut groove wall. Variation grooves preferably have no undercuts. A locking hierarchy may be developed, or locking systems may be distinguished from one another, using these variation grooves. Depending on the locking system, the associated keys have a specific variation groove-variation rib combination. A locking hierarchy may also be developed via the variation grooves and variation ribs. The angle of inclination of the cutter shaft relative to a plane of the broad side is preferably between 5° and 50°. This angle is particularly preferably between 10° and 40°. The profiles of the key may be dry-machined when the flank angles of the cutter tooth ribs are greater than 90°, preferably greater than 92°.

The invention further relates to the refinement of a flat reversible key profile. This involves a production specification for keys of a locking system, the locking hierarchy also being configured by varying the key profile. However, the varying of the key profile may also be used to distinguish various locking systems from one another. The variation specification according to the invention for reversible key profiles provides that the groove flanks of the grooves, for each groove, converge in the direction of the groove base. One of the groove flanks is undercut. The rib associated with this undercut groove flank is a guide rib which remains substantially unaffected by the profile variation. Each of the two oppositely situated broad sides has two mutually parallel halves. One of the halves forms the undercut guide rib, the undercut rib wall facing the nearby narrow side of the key. The other half of the broad side forms a variation zone. According to the invention, the cross-section of the variation zone extends on an arc-shaped variation base line. This base line forms the basis for developing the profile variation. Starting from this arched base surface, ribs may be developed over the variation base surface. Variation grooves may also be introduced into the variation base surface. For the flat reversible key, the variation zone is situated opposite from the guide zone.

The invention further relates to a flat reversible key in which the two oppositely situated surfaces of the broad side of the key are divided into two parts in the direction of extent of the key shank. The key profile forms two zones on each broad side relative to the position of the longitudinal center axis. A variation zone has a variation base line which extends on an outwardly arched curved line. The guide zone extending parallel thereto has a guide rib which adjoins a guide groove. The rib flank facing the guide groove is undercut. This rib flank forms a flank angle relative to the plane of the broad side of the key which is less than 90°.

In addition to the broad side recesses for the coding, the flat reversible key may also have recesses in the form of supplemental profile recesses on the narrow side of the key. It is also provided that the guide rib which is elevated above the broad sides is provided with supplemental profile recesses which in particular are cut or drilled into the region of the undercut flank. These supplemental profile recesses preferably extend over the acute-angled edge line of the undercut flank to the head surface. These supplemental profile recesses, which may be located at one or both narrow sides of the key or also on the guide rib, are sampled by separate sensing elements in the associated lock cylinder. If the recesses are not present, the cylinder core of the lock cylinder cannot be unlocked.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE INVENTION

Figure 1:
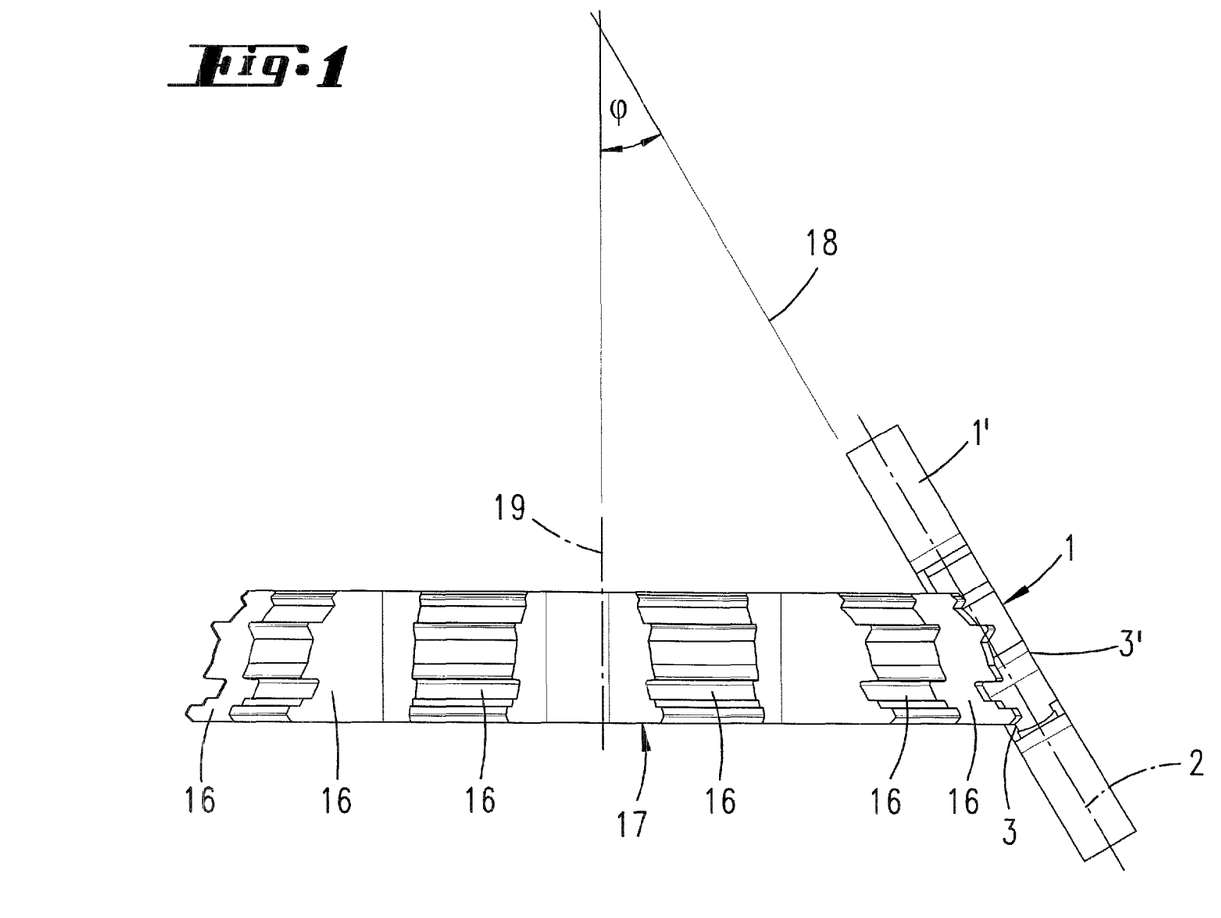
FIG. 1 shows in a rough schematic manner the spatial arrangement of a clamped key blank in relation to a milling cutter 17 which machines a broad side 3.

FIG. 1 shows the spatial relationship between the key blank 1 and the milling cutter 17. The key blank, which has a key shank having parallel broad sides 3, 3' and a key bow 1', is held in a clamping device by clamping means, (not illustrated), for example clamping jaws. The two planes of the broad sides 3, 3' of the key, which extend parallel to the longitudinal center plane 2 of the key blank, define a reference plane. The shaft axis 19 about which a profile cutter 17 is rotated is inclined by an angle (relative to the longitudinal center plane 2 of the key blank 1. In the exemplary embodiment, the angle of inclination $\phi$ is approximately 30°.

The milling cutter 17 has a peripheral surface which extends substantially on a conical lateral surface 18, the opening angle of the cone corresponding to the angle of inclination $\phi$. As a result, a line drawn through the conical lateral surface 18 in the region of the teeth engagement in the plane of the broad side of the key blank 1 extends parallel to the plane of the broad side of the key blank. The milling cutter 17 has a multiplicity of cutter teeth 16 on its peripheral surface which have cutter tooth ribs and cutter tooth grooves having a profile complementary to that of the grooves 4, 5, 6, 12 or ribs 8, 9, 11 of the key to be produced.

For profiling one of the two broad sides 3, 3' of the key blank that face away from one another, the milling cutter 17, which is rotationally driven about the shaft axis 19, is advanced. In the illustration corresponding to FIG. 1, the direction of advancement corresponds to a displacement of the milling cutter 17, perpendicular to the shaft axis 19, to the right, and with reference to FIG. 2, to the left. Either the milling cutter 17 or the key blank 1, i.e., the clamping device gripping the key blank 1, is then displaced in the direction of extent of the key shank. In the illustrations corresponding to FIGS. 1 and 2, this displacement occurs perpendicular to the plane of the drawing.

Figure 2:
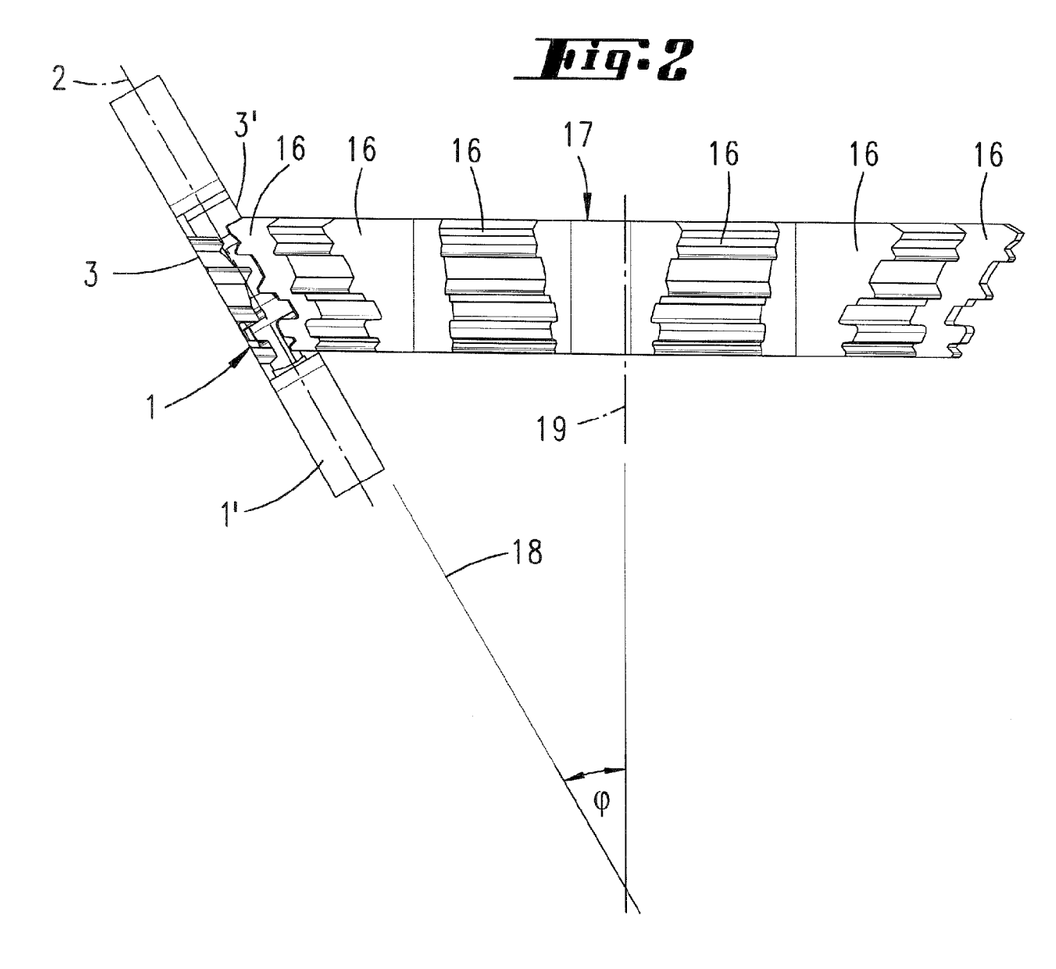
FIG. 2 shows an illustration corresponding to FIG. 1, but in this case for producing the second broad side 3' of the key.
Figure 4:
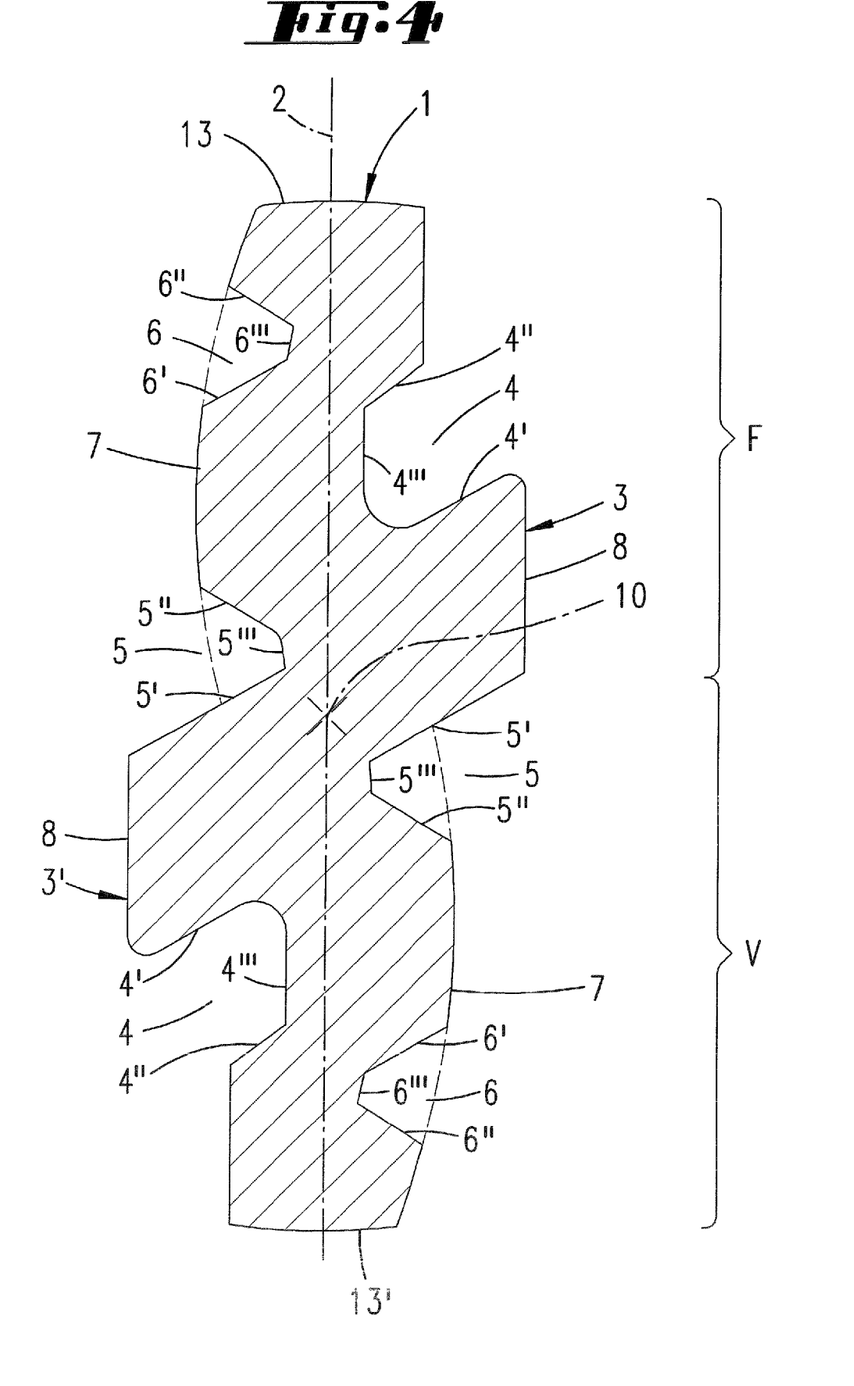
FIG. 4 shows a first profile variation based on the base profile illustrated in FIG. 3.
Figure 5:
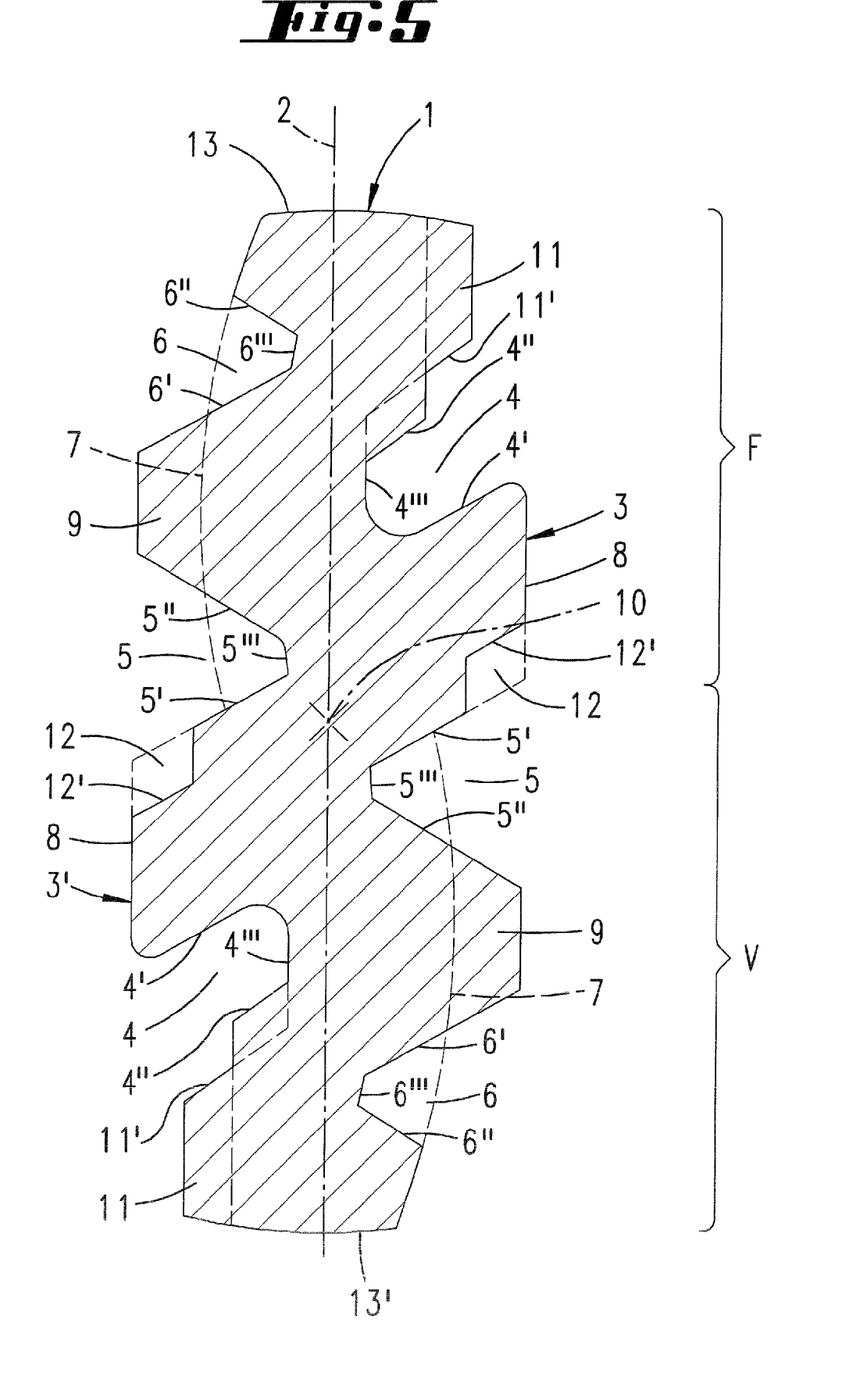
FIG. 5 shows another profile variation based on the base profile illustrated in FIG. 3.
Figure 6:
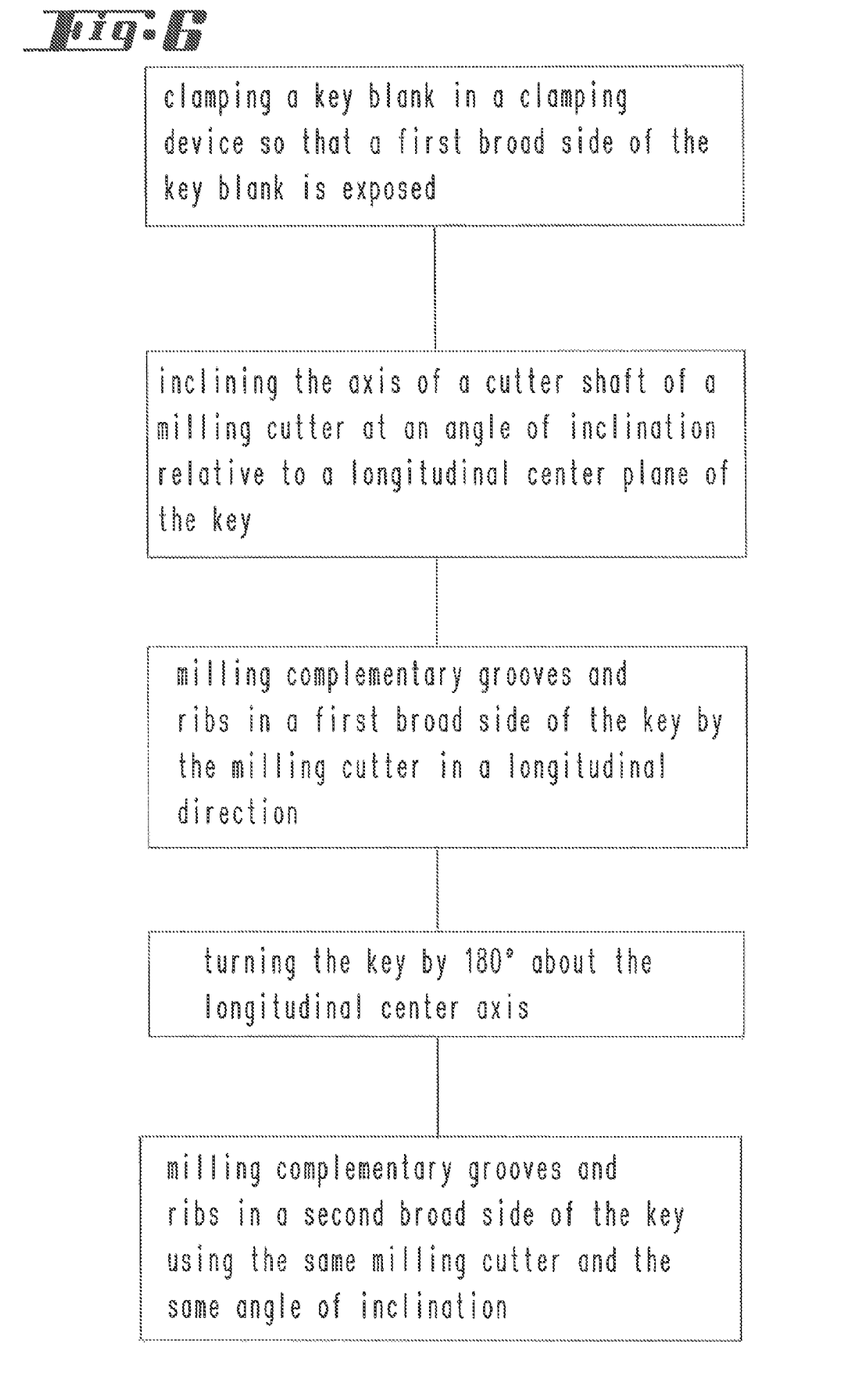
FIG. 6 is a flow chart schematically illustrating the steps of the method.

After the first broad side of the key 3 has been produced in the clamping setting illustrated in FIG. 1, the key blank 1 is turned by 180° about the longitudinal center axis 10 and is reclamped (clamping setting in FIG. 2). The milling cutter 17 is then used to profile the opposite broad side 3', resulting in a profile as illustrated in FIGS. 3 through 5, for example.

Locking systems have various hierarchical levels, as well as identical groups in the hierarchy. All lock cylinders of all groups of a locking system may be locked using a grand master key. On the other hand, a group key may be used only to lock all lock cylinders of the associated group. Since the number of possible pin combinations is limited, lock cylinders of different groups are distinguished from one another by different groove/rib profilings. For example, a key of a particular group has a specific variation rib, and all lock cylinders of this group have a key channel having a variation groove which corresponds to this variation rib. The lock cylinders of all other groups do not have this variation groove. However, these individual lock cylinders have other variation grooves which correspond to a group-specific variation rib which every key belonging to this group possesses. As a result of this configuration, lock cylinders of various groups may have the same pin tumbler combinations. Due to the different types of rib profiles, however, redundancy of the locks is prevented. Locking systems may be distinguished from one another via variation grooves in the key profile. All keys which belong to a locking system then have this variation groove. The key channels of the associated lock cylinders then have on their side walls one variation rib in each case which corresponds to this variation groove, so that keys which do not have this variation groove cannot be inserted into the lock cylinders.

Figure 3:
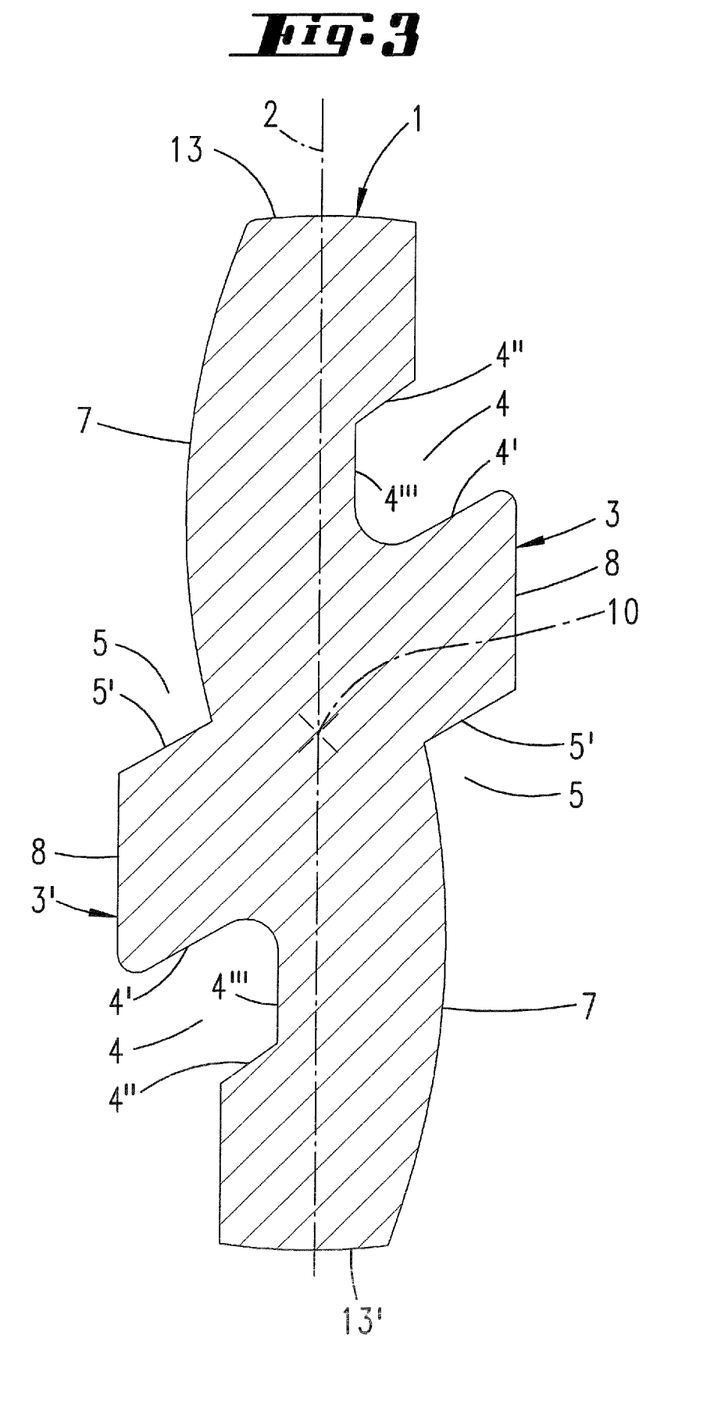
FIG. 3 shows a cross-section of the base profile.

The invention relates to a base profile, which is illustrated in FIG. 3 and which is the starting point for creating a profile variation for one or more locking systems. This base profile has a first groove 4, which is a guide groove in which a rib of the wall of the associated key channel is able to engage. The base profile is a reversible key profile. The two broad sides 3, 3' of the key that face away from one another have a profile curve which extends symmetrically about a single point, relative to the longitudinal center axis 10. Located on each of the two broad sides 3, 3' is a guide portion which is formed by the half of the particular broad side 3, 3' in which the guide groove 4 is situated. A guide rib 8 is situated adjacent to the guide groove 4.

The key profile 1 has two narrow sides 13, 13' which face away from one another. The guide groove 4 of the broad side 3 has a groove flank 4' which extends at an angle, relative to the plane of the broad side of the profiled key extending through the head surface of the rib 8, which is less than 90°. In the exemplary embodiment, the angle is approximately 60°. The guide groove 4 has a groove base 4''' which extends parallel to the longitudinal center plane 2 of the key, i.e., parallel to the plane of the broad side of the key. The groove flank 4'' situated opposite from the groove flank 4' extends at an angle of <90° relative to the plane of the broad side of the key. The groove flanks 4', 4'' may extend parallel to one another. In the exemplary embodiment, however, they extend at a small angle relative to one another, and converge toward the groove base 4'''.

The undercut groove flank 4', which at the same time forms the rib flank of the guide rib 8, faces the narrow side 13. Flank 5' of the rib 8 facing the oppositely situated narrow side 13' extends approximately parallel to the groove flank 4''. Flank 5' likewise forms a groove flank. This is a variation groove 5 which has only one groove wall 5' in the case of the base profile. The undercut guide rib flank 4' remains unchanged in all profile variations.

The variation zone of the key profile has an arched base contour line 7 which corresponds to an arched broad side portion. This is a portion of an outer cylindrical lateral wall, the axis of the cylinder which defines this curved surface extending parallel to the longitudinal center axis 10.

The variation zone and the guide zone are associated with one another in such a way that the guide groove 4 is situated opposite from the arched variation base surface 7. Due to the symmetrical configuration of the key profile about a single point, the undercut groove flank 4', i.e., rib flank 4', faces the narrow side 13'. The rib flank 5' facing away from this guide rib flank 4' points toward the variation zone, i.e., toward the narrow side 13.

FIG. 4 shows a first, more complex profile variation, for elucidation, based on the base profile shown in FIG. 3. The variation portion V, which is situated opposite from the guide portion F of the respective other broad side of the key, in this case has two additional variation grooves 5, 6 which are produced using the method according to FIGS. 1 and 2. The variation grooves 5, 6 have V-shaped converging groove flanks 6', 6'', 5', 5'', wherein none of the groove flanks 5', 5'', 6', 6'' are undercut; i.e., their angle relative to the broad side of the key is much greater than 90°. In this case the groove bases 5''', 6''' do not extend parallel to the longitudinal center plane 2.

FIG. 5 shows another, even more complex, profile variation which is likewise based on the base profile illustrated in FIG. 3. In this profile, in the variation region an additional variation rib 9 extends in the intermediate region between the variation grooves 5 and 6, the rib 9 being situated in such a way that the rib flanks 5''', 6' extend to the groove base 5''' or 6''', respectively.

In the region of the guide rib 8, a variation groove 12 which is open on one side is provided, whose groove flank 12' extends parallel to the undercut rib flank 4' and to the non-undercut rib flank 5'. The groove 12 is formed by a parallelogram-like notch in the corner region of the guide rib 8.

The guide groove 4 has been supplemented by a rib built up on the base profile in a parallelogram-like manner, so that the groove flank 4'' is situated closer to the groove flank 4'.

Another variation rib 11 is provided which is situated in the guide region F, the rib flank 11' being an extension of the groove flank 4'' of the base profile illustrated in FIG. 3.

While specific embodiments of the invention have been shown and described in detail to illustrate the inventive principles, it will be understood that the invention may be embodied otherwise without departing from such principles.

LIST OF REFERENCE NUMERALS

1 Key
2 Longitudinal center plane of the key
3 Broad side
4 Groove, groove flank
5 Groove, groove flank
6 Groove, groove flank 7 Arched portion of the broad side
8 Guide rib
9 Rib
10 Longitudinal center axis
11 Rib
12 Groove
13 Narrow side
16 Cutter tooth
17 Milling cutter
18 Conical lateral surface
19 Shaft axis

We claim:

1. A method for profiling broad sides of a flat reversible key, comprising the steps of: clamping a key blank so that a first broad side of the key blank is exposed; milling complementary grooves and ribs using a milling cutter that has cutter teeth on its peripheral surface and rotates about a cutter shaft, by advancing in a longitudinal direction of the key with respect to a longitudinal section profile of the cutter teeth; clamping the key blank in a position which is turned by 180° about the longitudinal center axis of the key so that a second broad side of the key blank is exposed; milling complementary grooves and ribs into the second broad side, using the same milling cutter, by advancing in the longitudinal direction of the key with respect to the longitudinal section profile of the cutter teeth, the ribs including a guide rib; and arranging the axis of the cutter shaft at an angle ($\phi$) relative to a longitudinal center plane of the key, and at least one cutter tooth rib of the cutter teeth producing an undercut guide wall, the two broad sides forming the grooves and ribs which extend symmetrically, in cross-section, about a single point, relative to a longitudinal central axis of the key, wherein groove flanks of each respective groove converge in a direction of a groove base, the flank of at least one groove forming an undercut flank of the guide rib which is situated opposite from a variation zone of the key having a cross-section that extends on an arc-shaped variation base line, in the variation zone variation grooves or variation ribs start from the variation base line in order to vary the key profile, wherein the angle of inclination ($\phi$) is between 5° and 50°.

2. The method according to claim 1, wherein the angle of inclination ($\phi$) is between 10° and 40°.

3. A base profile for a flat reversible key, the key having a key bit which has a first broad side and a second broad side situated opposite therefrom, the two broad sides forming grooves and ribs which extend symmetrically, in cross-section, about a single point, relative to a longitudinal central axis of the key, the ribs including a guide rib, wherein the groove flanks of each respective groove converge in a direction of a groove base, the flank of at least one groove forming an undercut flank of the guide rib which is situated opposite from a variation zone having a cross-section that extends on an arc-shaped variation base line, in the variation zone variation grooves or variation ribs start from the variation base line in order to vary the key profile, wherein the angle of inclination ($\phi$) is between 5° and 50°.

4. The base profile according to claim 3, wherein the variation groove(s) or the variation ribs(s) has/have flanks that do not form undercuts.

5. The base profile according to claim 3, wherein the undercut flank is the flank of the guide rib that remains unchanged in a profile variation of the base profile.

6. A flat key for a locking system comprising a plurality of lock cylinders, the key having a cross-sectional profile produced corresponding to a base profile according to claim 3.

7. The flat key according to claim 6, wherein the key has a narrow side with at least one supplemental profile recess.

8. The flat key according to claim 6, wherein the guide rib has at least one supplemental profile recess.

9. The flat key according to claim 8, wherein the at least one supplemental profile recess is in the undercut flank of the guide rib.

* * * * *